Nov. 3, 1964  H. S. PENDLEY  3,155,167
LAWN EDGERS
Filed Dec. 21, 1961

INVENTOR.
HENRY S. PENDLEY
BY
Patrick F. Henry
ATTORNEY

United States Patent Office 3,155,167
Patented Nov. 3, 1964

3,155,167
LAWN EDGERS
Henry S. Pendley, 1401 Carroll Drive NW., Atlanta, Ga.
Filed Dec. 21, 1961, Ser. No. 162,312
3 Claims. (Cl. 172—15)

This invention relates to a lawn edger and particularly to a hand operated, electric power tool having a rotary blade thereon adapted to be brought into engagement with the edge of the lawn, or in any similar application, to trim the edge in a neat fashion.

Many lawn edging devices have been disclosed in the prior art. Most of these operate on the principle of using a powerful (sometimes two or three horsepower) motor to drive an extremely strong blade for the purpose of cutting a relatively light and soft grass. These devices will also trim away excess dirt and debris and dig a trench if desired. Such prior art devices are relatively expensive in initial cost and require some maintenance because of the use of belts, pulleys, chains, gasoline engine, and similar apparatus which requires attention and which depreciates considerably through use. In this type prior art device there is usually a provision for lowering the cutting blade manually so as to dig it deeper into the ground or bring it into closer engagement with the edge of the grass. Ofttimes this adjustment is abused and the edging device is used as a trenching or digging device rather than a lawn edger.

Contrasted to the prior art devices, the present device is an extremely lightweight and readily manipulatable device which operates on the principle of high speed cutting and maneuverability rather than upon the principle of heavy duty power and manual actuation of the blade during cutting. The present device employs a high speed electric motor instead of the usual gasoline or heavy duty electric motor found in prior art lawn edgers.

Generally described, without regard to the scope of the invention as defined in the claims, the present device is a hand operated implement having a steel base plate or foot or shoe of bent formation which provides the sole support for the motor and blade. A pair of rubber-tired wheels are mounted at one end of the plate and a small but extremely high speed electric motor is mounted adjacent the opposite end of the plate in balanced relationship. An upwardly and rearwardly extended elongated handle member with a plastic covered handle is attached approximately in the center of the base plate in a slot therein and mounted on the transverse axle of the wheels. The lower portion of the handle is attached by an adjustment screw to an arcuate segment attached to the base plate having a slot therein in which the adjustment screw may be moved thereby adjusting the elevation and inclination of the handle member. A clamp arrangement suitably insulated with rubber and the like holds the motor in place and a stainless steel blade guard protects the top of the blade and also protects the user from accidently contacting the blade at the top. In operation, the device is lifted by the handle so as to be propelled on the pair of opposed wheels whereby the cutting blade may be brought into contact with the edge of the grass and is readily manipulated in all directions by the operator through the use of one hand at the end of the handle. The electric power for the device is supplied through a suitably insulated cable or cord passing from the motor through the handle and out to the source of power.

An object of this invention is to provide a relatively lightweight lawn edger power driven by a high speed electric motor.

Another object of this invention is to provide a lawn edger which is readily manipulated on a pair of opposed wheels whereby the front portion carrying the high speed rotating blade may be manipulated into engagement with the edge of the grass.

Still another object of this invention resides in the arrangement of the pair of wheels supporting an elongated base plate with the high speed motor positioned in a balanced relationship with respect to the wheels on the frame.

Other and further objects and advantages of my invention will become apparent upon reading the following specification taken in conjunction with the accompanying drawings, in which.

Figure 1:
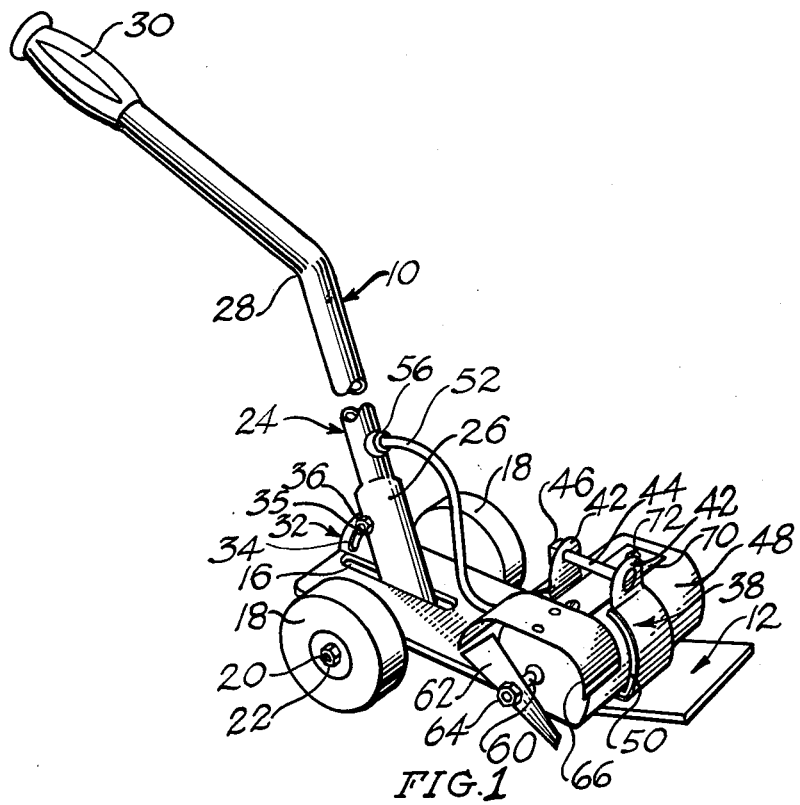
FIG. 1 is a perspective view of a preferred embodiment of my invention, having a portion of the handle broken away.
Figure 2:
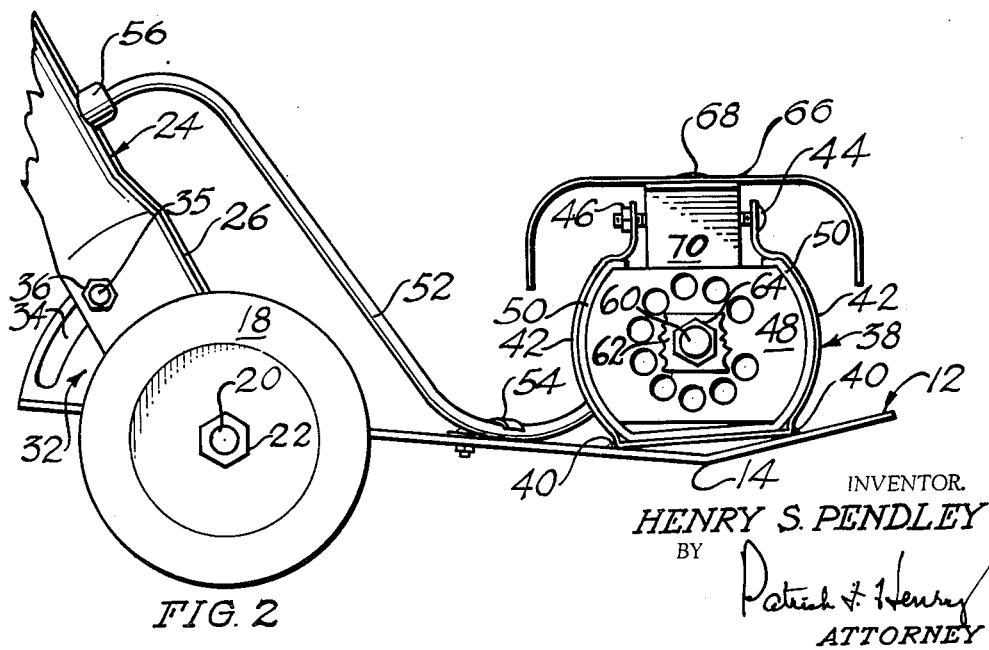
FIG. 2 is a side elevation view of the lawn edger shown in FIG. 1 with a portion of the handle broken away.

Referring initially to FIG. 1, the lawn edger overall is designated at 10 and comprises a base plate or shoe 12 of elongated, substantially rectangular construction and preferably made from steel plate material. The base plate or shoe 12 is bent at 14 near the outer edge thereof. The rearwardly portion of base plate 12 has an elongated, longitudinal slot 16 therein. Base plate 12 is supported at the end adjacent slot 16 by means of a pair of ground support, rubber-tired wheels 18 of identical construction and symmetrically supported on the shoe or base plate 12 by means of a transverse axle 20 fastened in place by an axle nut 22. Axle 20 is secured to the under surface of base plate 12 thereby retaining wheels 18 on the plate 12 so that the entire apparatus may be wheeled as a unit. Extending upwardly and rearwardly from the top of base plate 12 at the slotted portion 16 thereof is a hand operated handle member 24 of tubular construction and having the lower end 26 thereof extending through the slot and being attached to the axle 20 by means of axle 20 passing transversely therethrough.

Handle member 24 extends upwardly and rearwardly at a bent portion 28 and terminates with a plastic or rubber handle grip 30 of attractive appearance and providing a friction engagement surface which may be held in the hand.

An arcuate segment 32 with an arcuate slot 34 therein is attached to base 12 on its edge adjacent the elongated slot 16 and extends upwardly substantially vertically therefrom. Handle member 24 extends adjacent to and practically in contact with the segment 32 and is adjustably supported on the axle 20 and thereby attached to the shoe or base plate 12 by means of an adjustment screw 35 with a nut 36 thereon. Screw 35 is slidably retained on segment 32 in slot 34 and is fastened in place by means of nut 36 adjustably to hold the handle in selected rearward elevation.

A motor clamp arrangement 38 is welded at 40 or otherwise attached to the base plate 12 and comprises a pair of arcuate, opposed clamping portions 42 connected together at their tops by means of an elongated adjustment screw member 44 having a nut 46 thereon. A conventional high speed electric motor 48 which is adapted to run upwards of five or six thousand r.p.m. is permanently mounted on base plate 12 inside of opposed clamping portions 42. Motor 48 is carefully and thoroughly insulated by means of a heavy duty insulation 50 of material such as rubber, which encompasses the outer casing of motor 48 and insulates the motor from the opposed clamping portions 42 and in fact, from any other contact with the clamps 42 or any portion of the clamping apparatus 38 or the base plate 12. A suitable heavy duty motor cable 52 is connected internally (not shown) to the motor 48 and extends across the base plate 12 held in place by a fastener 54 and thence into the handle member 24 whereat it is insulated by a rubber grommet 56.

Cable 52 extends any length desired back to the source of power at a residence.

Motor 48 has an outwardly extending and projecting motor shaft 60 thereon. A short twisted blade member 62 has an opening in the center thereof by which it is permanently mounted on shaft 60 and fastened in place by means of a nut 64. Blade member 62 is not an extremely long blade and extends just slightly beyond base plate 12. A blade guard member 66 of curved formation extends over and above blade 62 and curves downwardly on each side thereof to provide sufficient protection on top of the blade to prevent foreign objects from falling onto the blade and also to prevent the operator from accidently touching the blade from the top or from bringing his foot into contact therewith. The guard 66 is attached by a rivet 68 to a curved bracket member 70 which is fastened in place by screw 72 on top of the casing of motor 48.

In the operation of the device, it is to be noted that brute force and heavy duty power is not the main objective since the device is substantially lightweight and since the motor is of fractional horsepower with extremely high speed. The main object of cutting with the device is ease and simplicity afforded through the light weight arrangement which permits maximum manipulation of a high speed blade. The device may be readily positioned with the wheels on the surface adjacent the lawn edge and then propelled along the edge parallel with the edge as the cutting blade 62 is manipulated at any angle desired to trim the edge of the grass. Many people like to trim their grass with a beveled edge and this is quite simple with the present device by tilting the entire device to the right or left hand side of the operator as he propels the device parallel with the edge of the grass. To assist in this, the handle member 24 is readily adjustable at screw 36 to place the hand at the proper elevation and height to suit the size of the operator and to suit the posture the operator desires to assume as he is operating the device.

In normal, or at-rest position, the motor 48 and bracket arrangement 38 plus the blade guard 66 provides a weight slightly more in leverage on the base plate 12 than the weight of handle member 24 and the rear of base plate 12. Thus, the device is off-balance in at-rest position but is adapted to be balanced by the weight of the hand and arm and force exerted on the end of the handle 30 thereby to bring the device into substantially a balanced position about the axle 20 as the device is propelled along parallel to and cutting the lawn edge. This also brings the end of plate 12 near motor 48 readily in a manipulatable position whereby it may be raised or lowered with respect to the ground and with respect to axle 20 so that the position of the blade 62 as it contacts the edge of the grass may be adjusted in height according to the manipulation of the handle by the operator and is readily shiftable or changeable instantaneously as the operator moves along the edge. This provides a maximum amount of adjustment and manipulation with respect to the shorter blade 62 and at the same time eliminates the necessity for digging a blade into the ground and into the turf all at one time or with such tremendous force as to require quite a heavy or large horsepower engine. By means of the relationship between the motor, the base plate 12 and the wheels 18 plus the positioning of handle 24 it is possible to manipulate the low horsepower high speed motor to achieve maximum trimming with substantial ease and with virtually no tiring attributable to propelling a heavy device.

While I have shown and described a particular embodiment of my invention together with suggested uses thereof, this is by way of illustration only and is not to be construed as any sort of limitation on the scope or the operation of my device since various alterations, substitutions, eliminations, changes, deviations, and variations may be made in the particular embodiment shown without departing from the scope of my invention as defined in the appended claims.

I claim:

1. In a lawn edger, an elongated base plate of substantially flat construction having a bent forward end thereon tilting slightly upwardly from the rest of said plate, there being an elongated slot in the rearward end of said plate, a transverse axle member mounted on said plate adjacent said slot, a pair of opposed wheel members mounted on opposite sides of said plate in substantial alignment and opposition thereon and adapted to support said plate on the ground, an elongated handle member having the lower end thereof extending through said slotted portion of said plate and being attached pivotally to said axle member, an upstanding arcuate adjustment plate mounted adjacent said slot, an arcuate slot in said plate, an adjustment screw fastening said handle to said adjustment plate in said adjustment slot whereby said handle may be selectively moved and titled into adjusted position thereon and held in place by said adjustment member, a motor retainer supported at least partly on the forward, upwardly tilted end of said plate, a high speed electric motor mounted in said retainer, insulation means insulating said motor from said retainer and from said base plate, a high speed blade mounted on one end of said motor and projecting from said base plate and extending therefrom, and an electrical cable internally connected with said motor and extending for connection to a source of electrical power.

2. In a lawn edger, an elongated base plate of substantially flat construction having a bent forward end thereon tilting slightly upwardly from the rest of said plate, there being an elongated slot in the rearward end of said plate, a transverse axle member mounted on said plate adjacent said slot, a pair of opposed wheel members mounted on opposite sides of said plate in substantial alignment and opposition thereon and adapted to support said plate on the ground, an elongated handle member, having the lower end thereof extending through said slotted portion of said plate and being attached pivotally to said axle member, an upstanding arcuate adjustment plate mounted adjacent said slot, an arcuate slot in said plate, an adjustment screw fastening said handle to said adjustment plate in said adjustment slot whereby said handle may be selectively moved and tilted into adjusted position thereon and held in place by said adjustment member, a high speed electric motor mounted on said plate, insulation means insulating said motor from said base plate, a high speed blade mounted on one end of said motor and projecting from said base plate and extending therefrom, and an electrical cable internally connected with said motor and extending for connection to a source of electrical power, said weight of said motor and blade and clamping arrangement being greater than the weight of said handle whereby said device at-rest normally rests upon the forward portion of said plate and whereby pressure may be applied to said rearwardly extending handle to off-balance same thereby raising or lowering the forward end of said plate at a selected distance during the operation of said device, said wheel plate being supported on wheels at one end only whereby said operator must tilt the forward end of said plate away from the ground as said device is propelled thereacross to selectively adjust the position of said blade with respect to the edge of the lawn to be trimmed.

3. In a lawn edger, an elongated base plate of substantially flat construction having a bent forward end thereon tilting slightly upwardly from the rest of said plate, there being an elongated slot in the rearward end of said plate, a transverse axle member mounted on said plate adjacent said slot, a pair of opposed wheel members mounted on opposite sides of said plate in substantially alignment and apposition thereon and adapted to support said plate on the ground, an elongated handle member having the lower end thereof extending through said slotted portion of said plate and being attached pivotally to said axle member, an upstanding arcuate adjustment plate mounted adjacent said slot, an arcuate slot in said plate, an adjustment screw fastening said handle may be selectively moved and tilted into adjusted position thereon and held in place by said adjustment member, a motor clamp supported at least partly on the forward, upwardly tilted end of said plate and having a pair of opposed clamping portions, adjustable pressure means connecting said clamping portions together to bring same into clamping engagement, a high speed electric motor mounted in said clamping member between said clamp members and being held in place by said clamp adjustment, insulation means surrounding said motor casing and insulating same from said clamp and from said base plate, a high speed blade mounted on one end of said motor and projecting from said base plate and extending therefrom, and an electrical cable internally connected with said motor and extending for connection to a source of electrical power, said weight of said motor and blade and clamping arrangement being greater than the weight of said handle whereby said device at-rest normally rests upon the forward portion of said plate and whereby pressure may be applied to said rearwardly extending handle to off-balance same thereby raising or lowering the forward end of said plate at a selected distance during the operation of said device, said wheel plate being supported on wheels at one end only whereby said operator must tilt the forward end of said plate away from the ground as said device is propelled thereacross to selectively adjust the position of said blade with respect to the edge of the lawn to be trimmed.

References Cited in the file of this patent

UNITED STATES PATENTS

| | | |
|---|---|---|
| D. 179,867 | Swann et al. | Mar. 12, 1957 |
| 1,052,789 | Bergstrom | Feb. 11, 1913 |
| 2,410,196 | Benthall | Oct. 29, 1946 |
| 2,660,847 | Britten | Dec. 1, 1953 |
| 2,759,319 | Smith | Aug. 21, 1956 |
| 2,795,915 | Miller | June 18, 1957 |
| 2,827,748 | Simpson | Mar. 25, 1958 |
| 2,932,144 | Garner et al. | Apr. 12, 1960 |
| 2,938,323 | Livingston et al. | May 31, 1960 |
| 2,946,172 | Hale et al. | July 26, 1960 |